Feb. 28, 1939.  E. R. SHAFFER  2,149,188
TRAILER COUPLING AND AUTOMATIC BRAKE MECHANISM
Filed Oct. 6, 1936  2 Sheets-Sheet 1
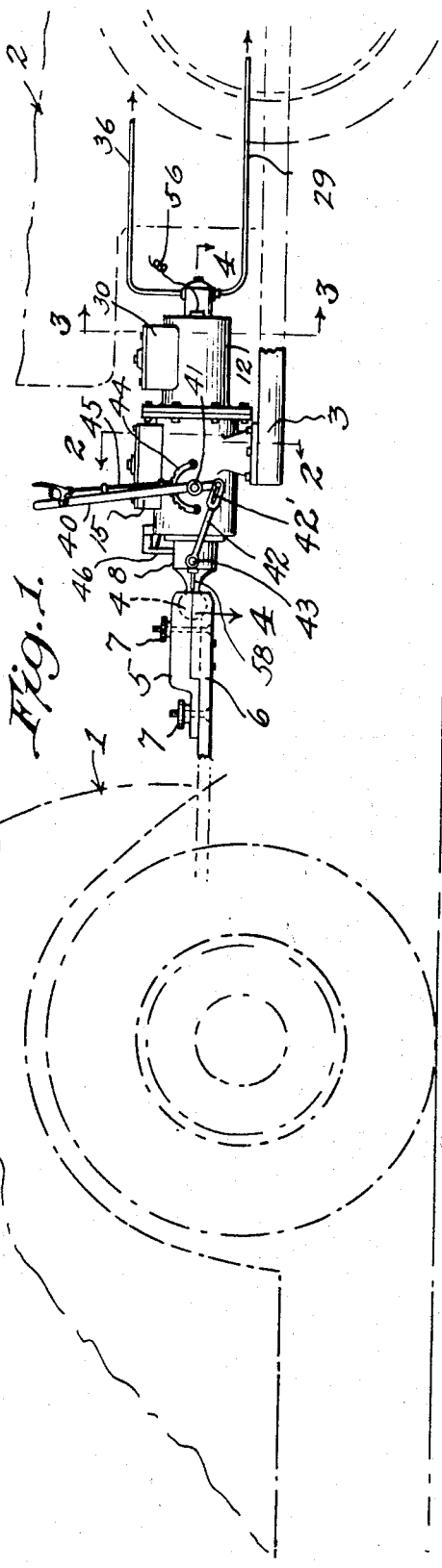
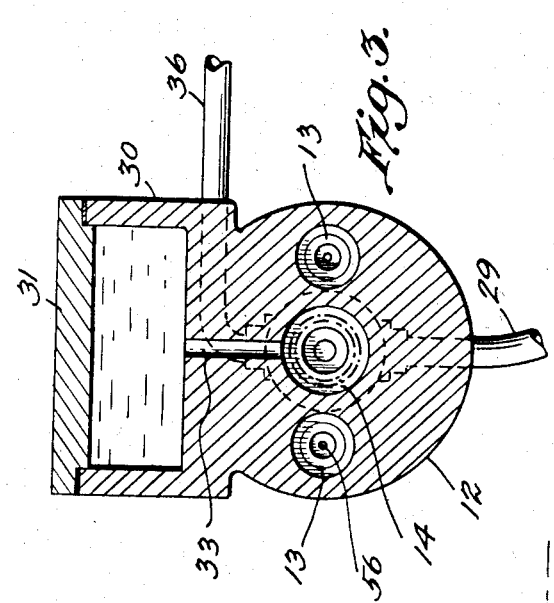
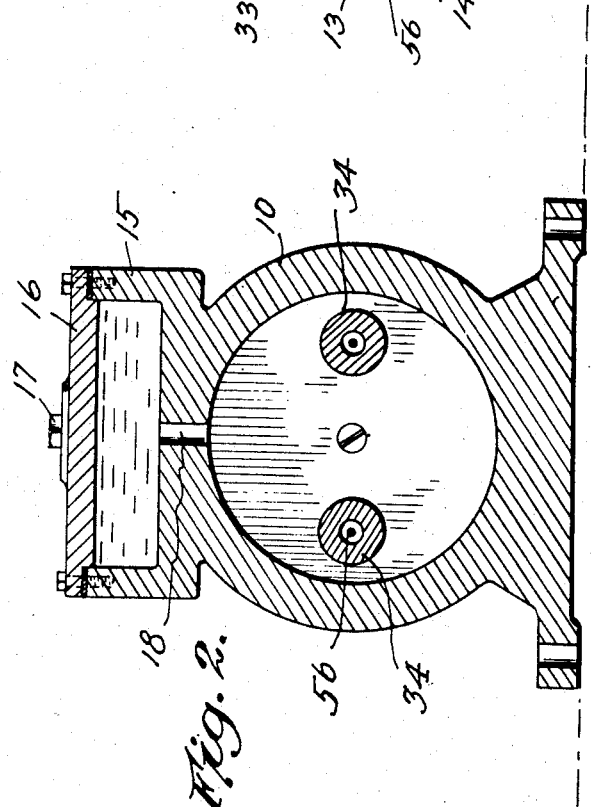
Inventor
E. R. Shaffer
By Eccleston & Eccleston,
Attorneys.

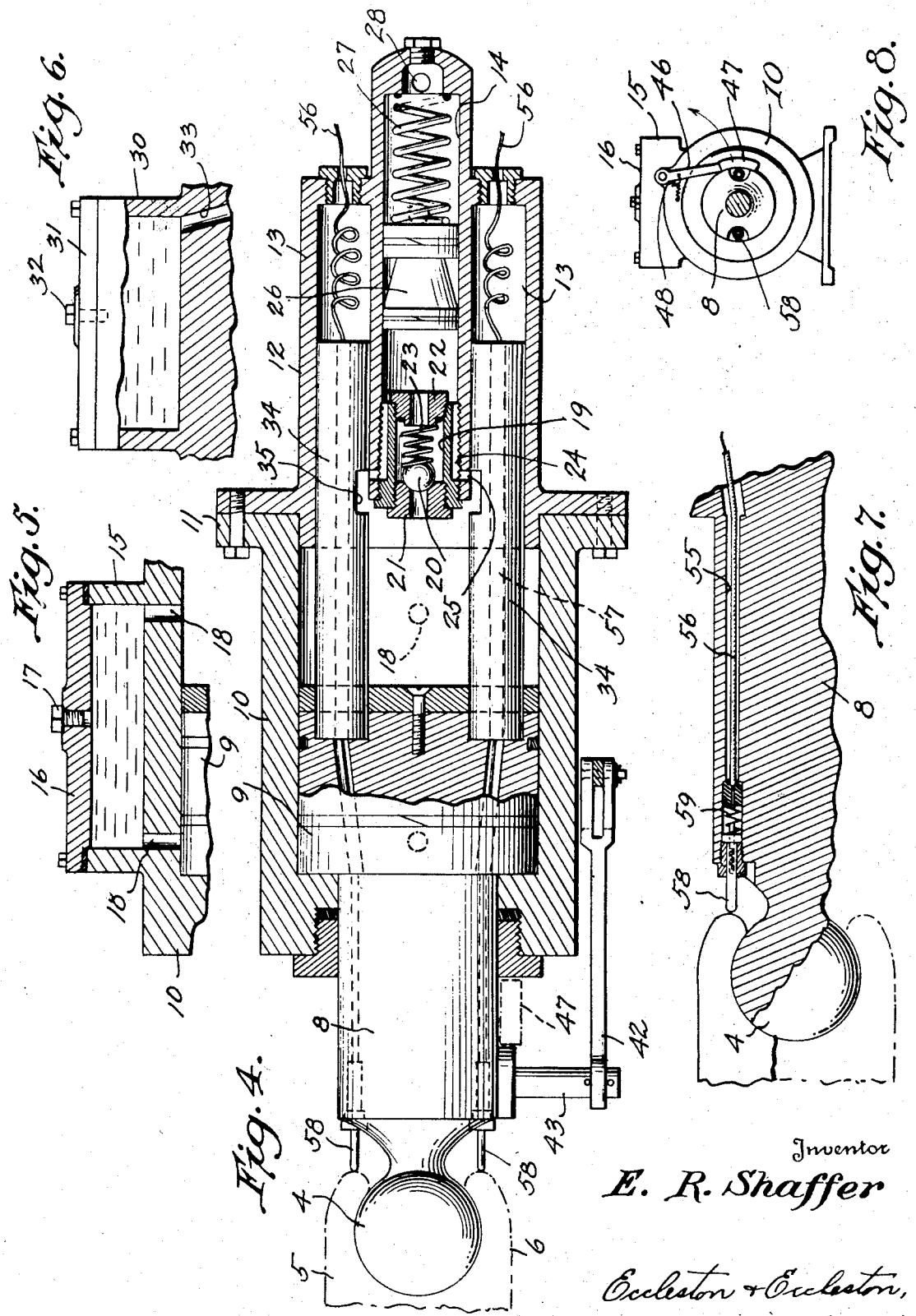

Patented Feb. 28, 1939

2,149,188

UNITED STATES PATENT OFFICE 2,149,188

TRAILER COUPLING AND AUTOMATIC BRAKE MECHANISM

Elgie R. Shaffer, Columbus, Ohio

Application October 6, 1936, Serial No. 104,276

8 Claims. (Cl. 188—142)

This invention relates to a combined trailer coupling and automatic brake operating mechanism, and has for its primary object to provide a novel hydraulic connection between two vehicles which serves not only as a shock absorber but also as a means of automatically applying the brakes to the trailing vehicle under certain conditions.

A further object of the invention resides in the provision of means for manually operating the brakes when the trailer is disconnected, or for locking the brakes on the trailer when stopping on a grade or when parking.

Another object of the invention consists in the provision of means for rendering the brake actuating means inoperative as when backing the vehicles.

A further object of the invention resides in the provision of a one-piece draw-bar and piston which will provide a metal to metal contact in the forward propelling of the vehicles.

A still further object of the invention consists in incorporating in the system a set of signals which are automatically operated by the coupling.

Another object of the invention consists in providing a coupling and automatic brake mechanism which may be set in operation by merely connecting the draw-bar-piston to the leading vehicle through engagement of the draw-bar head with a cooperating member mounted on the leading vehicle.

Other objects and advantages of the invention will be apparent from the following description when taken in connection with the accompanying drawings in which, Figure 1 is a side elevational view of the apparatus in operative relation to an automobile and trailer.

Figures 2 and 3 are vertical sectional views taken on lines 2—2 and 3—3 respectively of Figure 1.

Figure 4 is a horizontal sectional view taken on line 4—4 of Figure 1.

Figures 5 and 6 are fragmentary vertical sectional views through storage tanks connected with the two cylinders of the apparatus.

Figure 7 is a detail view indicating the manner of automatically operating the signals for right and left turns, and Figure 8 is an end view, partly in section, showing the lockout mechanism.

Referring to the drawings in more detail the numeral 1 indicates a portion of an automobile and the numeral 2 indicates a portion of a trailer connected thereto by a novel shock-absorber coupling which forms the subject-matter of the present invention. The main body of the coupling is bolted to the chassis of the trailer as indicated by numeral 3 and is provided with a ball or head 4 which is detachably connected to a member mounted on the leading vehicle. This member consists of upper and lower plates 5 and 6 releasably clamped together by screws 7 and having complementary depressions adapted to engage the ball or head 4. By this arrangement a ball and socket connection is provided between the two vehicles.

By reference to Figure 4 it will be noted that the ball 4 is integrally formed on the forward end of a draw-bar 8. On the opposite end of this draw-bar is integrally formed a piston 9 mounted in a cylinder 10. The rear end of cylinder 10 is provided with an annular flange 11 to which is bolted a cylindrical member 12. This member 12 is bored to provide three transversely arranged cylinders as indicated in Figures 3 and 4, the outer cylinders being indicated by numeral 13 and the inner cylinder by numeral 14.

Integrally formed on the upper side of cylinder 10 is a tank 15 provided with a closure 16 and filling opening 17. The tank 15 and cylinder 10 are filled with a suitable fluid and communication between the tank and cylinder is provided by two apertures 18 located in the bottom of the tank at its opposite ends and adjacent the ends of the cylinder 10. Relative movement between the piston 9 and cylinder 10 will cause a portion of the fluid in the cylinder to pass upwardly through one of the openings 18 and downwardly through the other opening 18 into the opposite end of the cylinder. This action serves to take up the shock between the vehicles in starting, stopping, etc.

Threaded in the inner end of the cylinder 14 is a valve thimble 19 for a ball valve 20. Apertured discs 21 and 22 are mounted in the opposite ends of thimble 19, the disc 21 providing a seat for the valve 20 and the disc 22 providing a seat for a spring 23 which presses the valve against its seat 21. The thimble 19 is provided on its exterior with longitudinal channels 24 communicating with apertures 25 in the wall of cylinder 14. When the piston 9 is moved to the right with respect to cylinder 10 a portion of the liquid displaced by the piston will force the valve 20 from its seat and enter cylinder 14 through the apertures of discs 21 and 22.

Within the cylinder 14 is a piston 26 normally biased to the left (Fig. 4) by a spring 27 within the cylinder, but adapted to be moved to the right when the force entering the cylinder is sufficient to overcome the spring. In the end of the cylinder is an aperture 28 to which a pipe 29 is connected and which leads to the brake mechanism of the trailer. Integrally formed on top of the member 12 is a tank 30 provided with a closure 31 and a filling opening 32. An aperture 33 provides communication between the rear end of tank 30 and the cylinder 14. The aperture 33 is so located that it will be closed after a slight movement of piston 26 and it will be apparent that further movement of the piston will transmit fluid pressure through aperture 28 and pipe 29 to the brake mechanism, in the usual manner.

In order to release the brakes after they have been applied means must be provided for relieving the pressure on the left side of piston 26, and to this end pistons 34 are slidably mounted in the cylinders 13. These pistons are rigidly connected to the main piston 9 and are provided with cut-out portions 35 cooperating with the apertures 25 in the walls of cylinder 14. The pistons with their cut-out portions 35 serve as slide valves and effectively seal the liquid from cylinder 10 in cylinder 14, or allow its return to the main cylinder depending upon the positions of the notches 35 with respect to the apertures 25. With the notches in the positions indicated in Figure 4 the liquid at the left side of piston 26 will be allowed to escape through channels 24, apertures 25 and notches 35 to the interior of cylinder 10. However, when the pistons 34 are moved slightly to the right of the position indicated in Fig. 4 the notches 35 are closed and consequently any pressure entering cylinder 14 through valve 20 will be sealed against escape until such time as the pistons are again moved to the positions indicated in Figure 4. The fluid pressure entering at the left of cylinder 14 will, of course, cause the brakes to be applied by reason of moving piston 26 to the right and thereby transmitting fluid pressure through pipe 29 to the trailer brakes.

For the purpose of automatically operating a stop signal a second pipe 36 is connected to cylinder 14 and it will be apparent that when a pressure is created in the cylinder to apply the brakes it will be also transmitted through pipe 36 to close a switch or the like for displaying the stop signal. Upon release of the pressure in the cylinder 14 as above mentioned the brakes will be released and the stop signal will be rendered inoperative.

It is sometimes desirable to apply the brakes to the trailer by hand as when parking or when the trailer is detached from the leading vehicle, and for this purpose manually operated means are provided. This mechanism comprises a hand lever 40 pivoted to a side of cylinder 10 as indicated by numeral 41, and a connecting rod 42 pivoted to the lower end of lever 40 and to the draw-bar 8 as indicated at 43. A quadrant 44 is mounted adjacent lever 40 and a pawl 45 connected to the lever cooperates with the quadrant to lock the lever in its adjusted positions. The connecting rod 42 is provided with a longitudinal slot 42' at its point of connection with hand lever 40 so as to permit freedom of action of the connecting rod when the hand lever is thrown to inoperative position.

In order to lock out the automatic brake mechanism under certain conditions as when it is desired to back the vehicles, an arm 46 is provided. This arm is pivoted to the forward end of cylinder 10 and is provided with an enlargement or block 47 which is adapted to seat between the pivot pin 43 and the end of the cylinder 10. A spring 48 is connected to arm 46 and to the cylinder and serves to hold the arm 46 and block 47 in either the operative position shown in Figure 8 or in inoperative position on the opposite side of the cylinder. With the block 47 in the position indicated it will be apparent that relative movement between the parts 8 and 10 is prevented and the trailer brakes are rendered inoperative.

In order that right and left turns of the vehicle may be automatically indicated at the rear of the trailer means have been provided for operating such signals through the relative movement of the ball and socket connections between the vehicles. To this end the draw-bar 8 is provided with two longitudinal passages 55 in which are mounted electrical conductors 56. These conductors also extend through passages 57 formed in the pistons 34 and through cylinders 13 to the signals mounted on the rear of the trailer. Plunger type switches are operatively connected to the forward ends of the conductors 56 and one of them is shown in detail in Figure 7. The plunger is indicated by the numeral 58 and is normally held in open position by a coil spring 59. The outer ends of these plungers are positioned closely adjacent the shoulders of the socket formed in the plates 5—6 and it will be apparent that when the leading vehicle turns to the right or left the particular plunger 58 will be depressed and the proper turn signal will be illuminated.

In the operation of the device, the trailer is connected to the leading vehicle by loosening the nuts 7, inserting the ball or head 4 between the complementary socket portions of the members 5 and 6 and tightening up on the nuts 7. The hand brake 40 is then released and the lock-out 46—47 swung to inoperative position where it is held by spring 48. If, while travelling along the highway, the trailer tends to overrun the leading vehicle, as for instance while descending a grade, the cylinder 10 will be pushed forward toward the leading vehicle. This relative movement between cylinder 10 and piston 9 will cause the fluid in the cylinder to be forced upwardly through the rear aperture 18 and downwardly through the forward aperture 18 if the piston 9 travels so far as to uncover the forward aperture. This action of the fluid in the cylinder 9 and tank 15 provides a shock absorbing effect in starting and stopping the vehicles as well as during travel. A portion of the fluid pressure created by the relative movements between the cylinder and piston will force the ball valve 20 off its seat and be projected into the brake operating cylinder 14 where it will force the piston 26 to the right (Fig. 4) against the pressure of spring 27. This movement of the piston 26 compresses the liquid or other fluid in the brake operating system and applies the brakes to a greater or lesser extent depending upon the pressure created at the left of piston 26.

When the overrunning of the trailer discontinues the draw-bar 8 will move forward with respect to the cylinder 10 and the auxiliary pistons 34 will likewise be drawn forward so as to position the notches 35 somewhat forward of the end of cylinder 14, as shown in Fig. 4. This position of the notches 35 permits escape of the fluid pressure from the left of piston 26 through channels 24, apertures 25 and notches 35 to the interior of cylinder 10. Release of this pressure from the left end of cylinder 14 allows the spring 27 to move piston 26 to the left thereby releasing the brakes and allowing the trailer to again run freely.

When it is decided to park the vehicle, or when the trailer is disconnected from the leading vehicle the brakes on the trailer may be manually applied by merely pushing the hand-lever 40 forwardly where it will be latched by pawl 45 on quadrant 44. This forward movement of the hand-lever 40 forces the piston 9 rearwardly so as to create a pressure in the left end of cylinder 14 and thereby causing the brake operating piston 26 to apply the brakes.

When brake operating pressure is created in the right end of cylinder 14 a portion of the pressure will be transmitted through the pipe 36 to a stop signal and will cause the same to be displayed. Right and left turn signals are automatically displayed by movement of the plunger switches 58 (Figs. 4 and 7). As the leading vehicle turns to the right, for instance, a shoulder of the clamp 5—6 will engage the plunger 58 at the right of the draw-bar and close the switch against the pressure of spring 59 thereby illuminating the "right turn" signal whereas a movement of the leading vehicle to the left will cause a similar operation in connection with the plunger of the "left turn" signal.

If it is desired to throw out of operation the automatic brake, as for instance when it becomes necessary to back the vehicles, the lock-out member 46—47 is swung to the position shown in Fig. 8 against the action of spring 48 and is then held in that position by the spring. With the block 47 placed in this operative position, indicated more clearly in dotted outline in Fig. 4, relative movement between the piston 9 and cylinder 10 is prevented, the piston being locked against the forward end of the cylinder. It will be apparent therefore that the coupled vehicles may then be moved forwardly or backwardly as desired without in any way affecting the automatic brake operating mechanism.

From the foregoing description taken in connection with the accompanying drawings it will be apparent to those skilled in the art that I have devised a relatively simple construction of trailer coupling and brake applying mechanism; that the coupling serves as a shock absorber between the two vehicles; that relative movement between the shock absorbing elements causes an instantaneous application or release of the trailer brakes; that the unitary draw-bar and piston 8—9 provides a solid metal connection in the forward pulling of the trailer; that the pressure created for applying the trailer brakes also serves to display a stop signal; that the trailer may be connected by merely securing the ball head 4 in the socket member 5—6; that the trailer brakes may be manually applied, as when parking, by a manipulation of the brake lever 40; that the automatic brake mechanism may be quickly locked out of operation by swinging the lock-out bar to the position indicated in Fig. 8, and that the "right" and "left" turn signals on the trailer are automatically operated as the leading vehicle turns to the right or left.

In accordance with the patent statutes I have described what I now believe to be the preferred form of the invention, but obviously various changes may be made in the details of construction without departing from the spirit of the invention and all such changes are intended to be included within the scope of the appended claims.

What I claim is:

1. A combined coupling and brake-operating mechanism for a leading vehicle and trailer, including a cooperating cylinder and piston connected between the two vehicles, a storage tank having communication with the opposite ends of the cylinder whereby a shock-absorbing action is provided, a second cylinder, a valve permitting fluid pressure to be discharged from the first cylinder to the second cylinder, a piston in the second cylinder adapted to be operated by the fluid pressure, said last-named piston adapted to compress a brake-operating fluid.

2. A combined coupling and brake-operating mechanism for a leading vehicle and trailer, including a cooperating cylinder and piston connected between the vehicles, a storage tank having communication with opposite ends of the cylinder whereby a shock-absorbing effect is provided, a fluid pressure brake-operating cylinder having communication with the first-mentioned cylinder, and means for controlling the entrance and exit of fluid pressure from the first cylinder to the second cylinder in accordance with the relative movements of the first-cylinder and piston.

3. A combined coupling and brake-operating mechanism for a leading vehicle and trailer, including a cooperating cylinder and piston connected between the vehicles, a storage tank having communication with the opposite ends of the cylinder whereby a shock-absorbing effect is provided, a fluid pressure brake-operating cylinder having communication with the first-mentioned cylinder, a non-return valve between said cylinders, said second-named cylinder provided with passages for the return of fluid from the second cylinder to the first cylinder, and slide valves operated by the first-mentioned piston for controlling said passages.

4. A combined coupling and brake-operating mechanism for a leading vehicle and trailer, including an hydraulic shock absorber connected between the vehicles, a fluid pressure brake-operating cylinder and piston, means for controlling the flow of fluid from the shock absorber to and from the brake-operating cylinder, and a pipe connected with the last-mentioned cylinder for conveying fluid pressure to a stop signal.

5. A combined coupling and brake-operating mechanism for a leading vehicle and trailer, including a fluid-operated shock absorber connected between the vehicles, a fluid pressure brake-operating cylinder and piston, means for permitting a flow of fluid from the shock absorber to the cylinder under certain conditions, and means for rendering the shock absorber inoperative.

6. A combined coupling and brake-operating mechanism for a leading vehicle and trailer, including a cylinder and piston connection between the vehicles, a fluid pressure brake-operating cylinder and piston, means for permitting a flow of fluid from the first-mentioned cylinder to the brake-operating cylinder under certain conditions, and releasable means for preventing relative movement between the first-mentioned cylinder and piston.

7. A combined coupling and brake-operating mechanism for a leading vehicle and trailer, including a cylinder and piston connection between the vehicles, a fluid pressure brake-operating cylinder and piston, means for permitting a flow of fluid from the first-mentioned cylinder to the brake-operating cylinder under certain conditions, and a spring-pressed arm for preventing relative movement between the first-mentioned cylinder and piston.

8. A combined coupling and brake-operating mechanism between two vehicles, including a master fluid operating shock-absorbing cylinder and piston, a second fluid brake-operating cylinder and piston, means for automatically providing shock-absorbing action in the master cylinder, and brake-operating action in the second cylinder when moved in one direction, and means for automatically releasing the brake-operating action in the second cylinder, and providing shock-absorbing action in the master cylinder when moved in the opposite direction, by relative movement between the two vehicles.

ELGIE R. SHAFFER.